US011627441B2

(12) United States Patent
Parikh et al.

(10) Patent No.: US 11,627,441 B2
(45) Date of Patent: Apr. 11, 2023

(54) RADIO ACCESS TECHNOLOGY (RAT) TYPE USAGE DIFFERENTIATION FOR DIFFERENTIAL CHARGING IN 5G NON-STANDALONE (5G NSA) ARCHITECTURE DEPLOYMENTS

(71) Applicant: Cisco Technology, Inc., San Jose, CA (US)

(72) Inventors: Dishant Mukesh Parikh, Gujarat (IN); Mukesh Yadav, Bangalore (IN); Aditya Prakash, Karnataka (IN); Ravi Shekhar, Maharashtra (IN); Vimal Srivastava, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 81 days.

(21) Appl. No.: 17/350,816

(22) Filed: Jun. 17, 2021

(65) Prior Publication Data

US 2022/0408301 A1    Dec. 22, 2022

(51) Int. Cl.
*H04L 12/14* (2006.01)
*H04M 15/00* (2006.01)
(Continued)

(52) U.S. Cl.
CPC .......... *H04W 4/24* (2013.01); *H04L 12/1407* (2013.01); *H04L 12/1432* (2013.01);
(Continued)

(58) Field of Classification Search
CPC .. H04L 12/14–1496; H04L 2012/5639; H04M 15/04–93; H04M 2215/01–96;
(Continued)

(56) References Cited

U.S. PATENT DOCUMENTS 10,798,562 B2    10/2020    Patil et al.
2015/0133081 A1*    5/2015    Griot ..................... H04W 4/24
(Continued)

FOREIGN PATENT DOCUMENTS

WO    WO-2018142021 A1 *    8/2018    .............. H04W 4/24

OTHER PUBLICATIONS

Cisco, "5G Non Standalone Solution Guide, StarOS Release 21.9", Cisco Systems, Inc, Jul. 31, 2018, 74 pages.
(Continued)

*Primary Examiner* — Timothy J Weidner
(74) *Attorney, Agent, or Firm* — Edell, Shapiro & Finnan, LLC

(57) ABSTRACT

A control plane function node may be used in a Fifth Generation (5G) Non-Standalone (NSA) architecture having Radio Access Network (RAN) level interworking between a Long-Term Evolution (LTE) RAN and a 5G New Radio (NR). The node obtains usage report data which are based on traffic of a user equipment (UE) via primary and secondary Radio Access Technologies (RATs). The node also obtains secondary RAT usage report data which are based on traffic of the UE via the secondary RAT. The node constructs a message which indicates a request for charging based on the usage report data and the secondary RAT usage report data. In constructing the message, the node populates, in association with a corresponding rating group and usage data of the UE, an identifier of a flow or bearer associated with secondary RAT usage, together with the secondary RAT usage report data.

20 Claims, 10 Drawing Sheets

(51) Int. Cl.
  *H04W 4/24* (2018.01)
  *H04W 24/10* (2009.01)
  *H04W 28/02* (2009.01)
  *H04W 28/08* (2009.01)
  *H04W 76/11* (2018.01)
  *H04W 76/15* (2018.01)
  *H04W 84/02* (2009.01)
  *H04W 88/08* (2009.01)
  *H04W 88/16* (2009.01)
  *H04W 88/18* (2009.01)
  *H04W 92/02* (2009.01)

(52) U.S. Cl.
  CPC ...... *H04L 12/1442* (2013.01); *H04L 12/1485* (2013.01); *H04M 15/41* (2013.01); *H04M 15/55* (2013.01); *H04M 15/80* (2013.01); *H04M 15/8235* (2013.01); *H04W 24/10* (2013.01); *H04W 28/0263* (2013.01); *H04W 28/0268* (2013.01); *H04W 28/0819* (2020.05); *H04W 28/09* (2020.05); *H04W 76/11* (2018.02); *H04W 76/15* (2018.02); *H04M 2215/2026* (2013.01); *H04M 2215/2046* (2013.01); *H04M 2215/32* (2013.01); *H04M 2215/74* (2013.01); *H04M 2215/784* (2013.01); *H04W 84/02* (2013.01); *H04W 88/08* (2013.01); *H04W 88/16* (2013.01); *H04W 88/18* (2013.01); *H04W 92/02* (2013.01)

(58) Field of Classification Search
  CPC .............. H04W 4/24; H04W 8/005–30; H04W 24/02–10; H04W 28/02–26; H04W 36/0005–385; H04W 60/005–06; H04W 76/10–50; H04W 84/005–22; H04W 88/005–188; H04W 92/02–24
  See application file for complete search history.

(56) References Cited

U.S. PATENT DOCUMENTS

2015/0201088 A1  7/2015  Wu et al.
2020/0052916 A1  2/2020  Kaki et al.
2020/0288021 A1  9/2020  Chai
2021/0044996 A1  2/2021  Long
2021/0075915 A1  3/2021  Qiao et al.
2021/0099909 A1  4/2021  Nithiyanantham et al.

OTHER PUBLICATIONS

Cisco, "5G NSA for MME", downloaded Apr. 10, 2020, 26 pages.
3GPP, "3rd Generation Partnership Project; Technical Specification Group Services and System Aspects; Telecommunication management; Charging management; 5G data connectivity domain charging; stage 2 (Release 17)", 3GPP TS 32.255 V17.1.1, Apr. 2021, 122 pages.
3GPP, "3rd Generation Partnership Project; Technical Specification Group Services and System Aspects; Telecommunication management; Charging management; 5G system, charging service; Stage 3 (Release 16)", 3GPP TS 32.291 V16.7.0, Mar. 2021, 134 pages.
3GPP, "3rd Generation Partnership Project; Technical Specification Group Services and System Aspects; Telecommunication management; Charging management; Diameter charging applications (Release 16)", 3GPP TS 32.299 V16.2.0, Dec. 2019, 207 pages.
3GPP, "3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.6.0, Jun. 2019, 69 pages.
Samsung, "4G-5G Interworking", RAN-level and CN-level Interworking, Jun. 4, 2017, 17 pages.
Tech-Invite, "Inside TS 23.501: 5GS Support for Dual Connectivity, Multi-Connectivity", https://www.tech-invite.com/3m23/toc/tinv-3gpp-23-501_zh.html, downloaded May 19, 2021, 5 pages.
Rolf Meakin, et al., "Making 5G pay", Strategy&, downloaded Feb. 19, 2019, 22 pages.
3GPP, Management, Orchestration and Charging for 5G networks, https://www.3gpp.org/news-events/1951-sa5_5g, Mar. 22, 2018, 8 pages.
Mike Dano, "Monetizing 5G is operators' biggest challenge for 2021—Omdia", https://www.lightreading.com/ossbss/monetizing-5g-is-operators-biggest-challenge-for-2021---omdia/d/d-id/766314, Dec. 28, 2020, 5 pages.

* cited by examiner

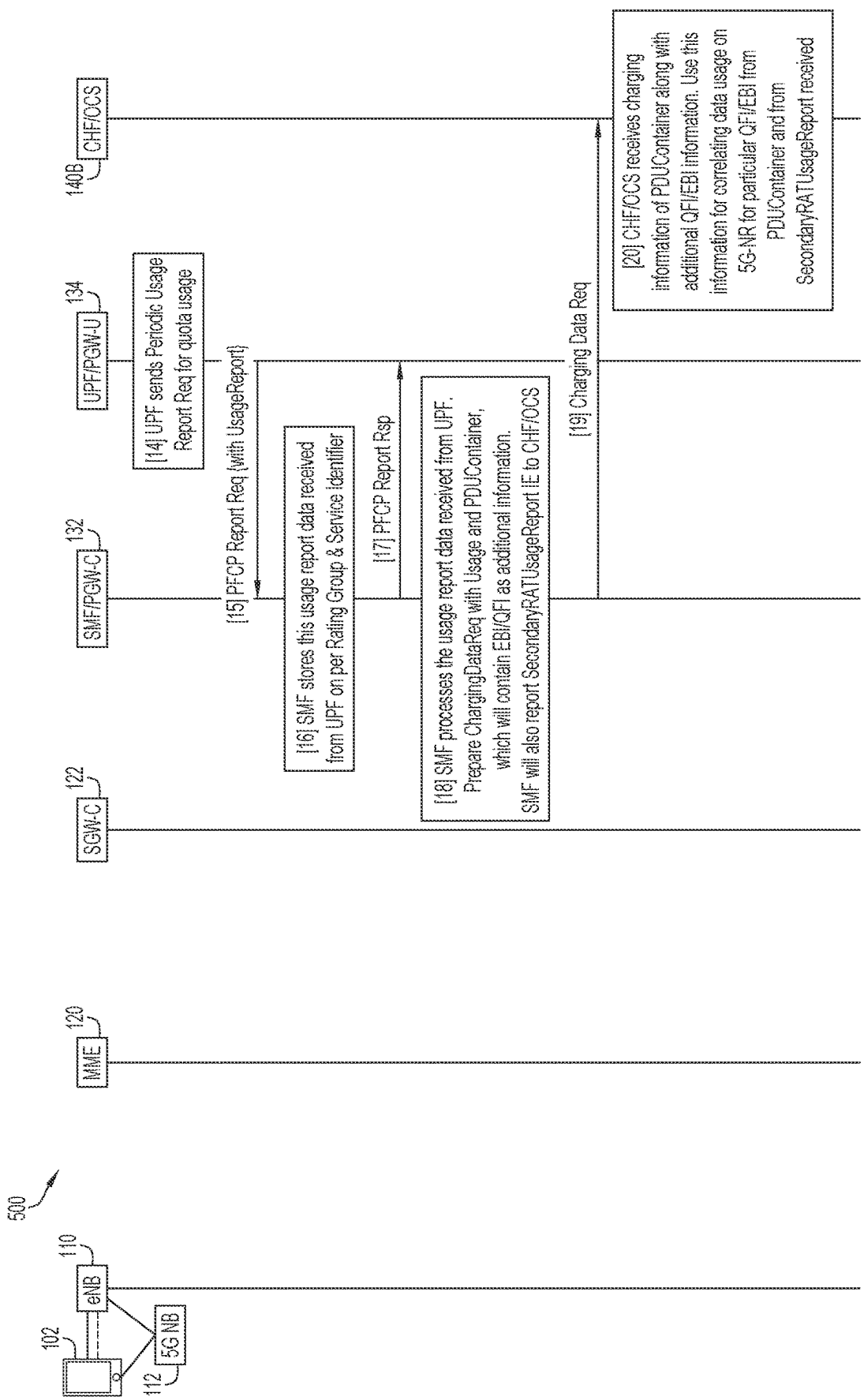

ated with the traffic of the UE communicated via the secondary RAT. The control plane function node may send to a charging server the message which indicates the request for charging, for use in differential charging.

RADIO ACCESS TECHNOLOGY (RAT) TYPE USAGE DIFFERENTIATION FOR DIFFERENTIAL CHARGING IN 5G NON-STANDALONE (5G NSA) ARCHITECTURE DEPLOYMENTS

TECHNICAL FIELD

The present disclosure relates generally to telecommunications systems, and more particularly to techniques and mechanisms for radio access technology (RAT) type usage differentiation for differential charging in a Fifth Generation (5G) Non-Standalone (5G NSA) architecture deployment having Radio Access Network (RAN) level interworking between a Long-Term Evolution (LTE) RAN and a 5G New Radio (NR) (5G NR).

BACKGROUND

In Fifth Generation (5G) network deployments, there are various interworking options defined by the Third Generation Partnership Project (3GPP) for interworking with Fourth Generation (4G)/Long-Term Evolution (LTE) based networks. Amongst all of the options defined by 3GPP, Options 3/3a/3x of the 5G Non-Standalone (5G NSA) architecture are popular. With these options, an Evolved Packet Core (EPC) may anchor calls communicated via both the eNodeB (eNB) (i.e. LTE) and the 5G Node B (5G NB) (i.e. 5G New Radio "5G NR"). Operators have the option of deploying dual connectivity so that a user equipment (UE) can communicate via both LTE and 5G NR radios. Here, the 5G NB may be used to support high data rate traffic of the UE, whereas the eNB can be used for handling the UE's remaining data traffic.

Operators are looking for ways to monetize high data rate traffic that is routed via the 5G NR. For the 5G NSA deployment with Options 3/3a/3x, however, a charging server of a charging system does not have adequate information to properly charge for usage that is consumed through 5G NR versus LTE Radio Access Technology (RAT). Additional messaging may be utilized to communicate such information, but such techniques may be deemed inefficient and/or require unnecessary changes to existing protocols.

BRIEF DESCRIPTION OF THE DRAWINGS

FIGS. 5A-5B form a more detailed call flow diagram for describing a more detailed call flow for RAT type usage differentiation for differential charging in a 5G NSA architecture deployment having RAN level interworking between an LTE RAN and a 5G NR according to some implementations of the present disclosure.

DESCRIPTION OF EXAMPLE EMBODIMENTS

Overview

Figure 1:
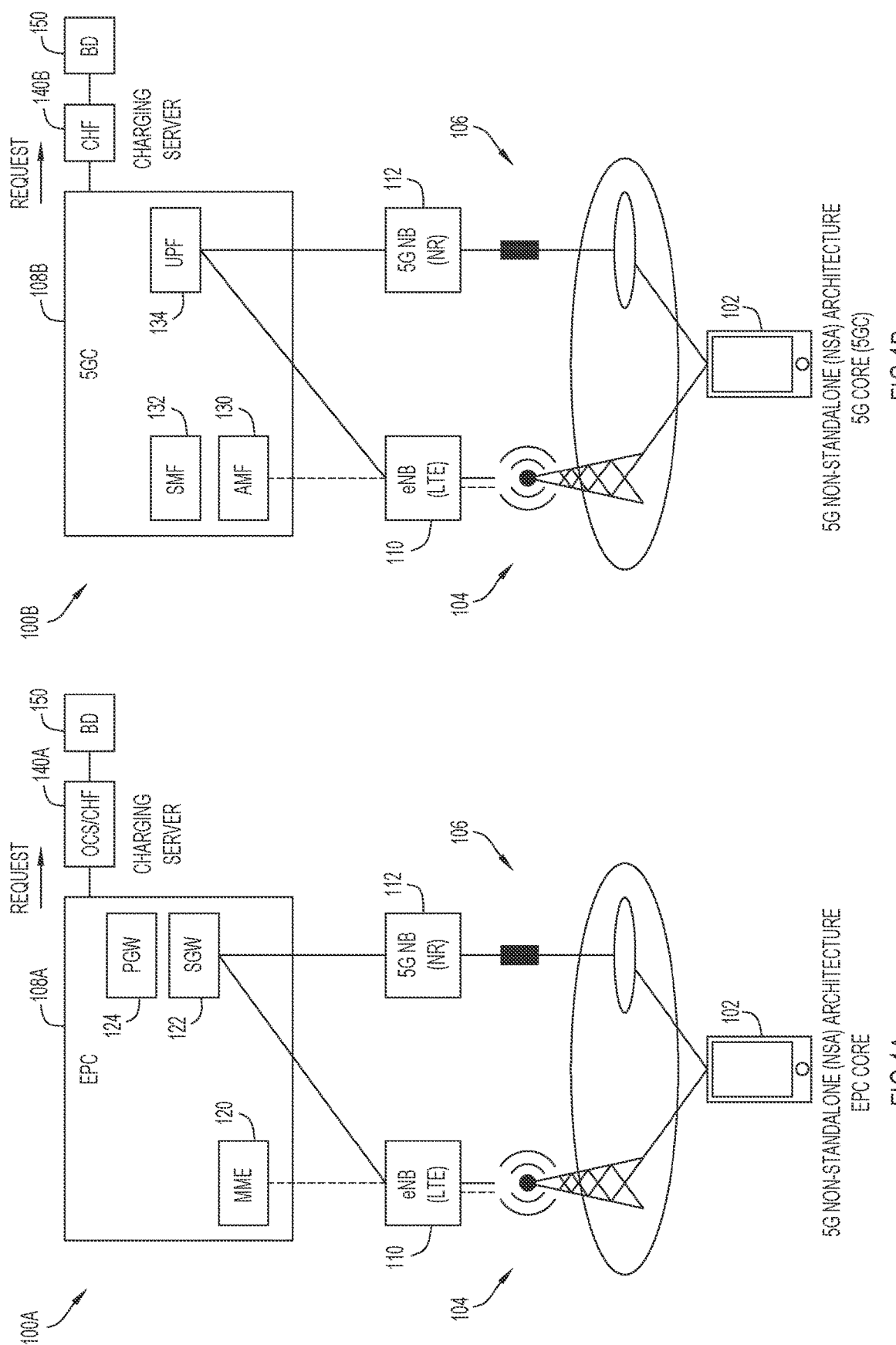
FIG. 1A is an illustrative representation of a Fifth Generation (5G) Non-Standalone (5G NSA) architecture having with Radio Access Network (RAN) level interworking between a Long-Term Evolution (LTE) RAN and a 5G New Radio (5G NR), showing connections to an Evolved Packet Core (EPC).
FIG. 1B is an illustrative representation of a 5G NSA architecture having with RAN level interworking between the LTE RAN and the 5G NR, showing connections to a 5G Core (5GC).

Techniques and mechanisms for Radio Access Technology (RAT) type usage differentiation for differential charging in a Fifth Generation (5G) Non-Standalone (5G NSA) architecture having Radio Access Network (RAN) level interworking between a Long-Term Evolution (LTE) RAN and a 5G New Radio (5G NR).

In one illustrative example, a control plane function node may be configured for use in a mobile network including the 5G NSA architecture having the RAN level interworking between the LTE RAN and the 5G NR. The control plane function node may obtain usage report data from a user plane function node, where the usage report data are based on traffic of a user equipment (UE) communicated via primary and secondary Radio Access Technologies (RATs) of the mobile network. The control plane function node may also obtain secondary RAT usage report data from a second RAT usage report, where the secondary RAT usage report data are based on traffic of the UE communicated via the secondary RAT and indicating a secondary RAT usage, a secondary RAT type of the secondary RAT, and an identifier of a flow or bearer associated with the secondary RAT type. The control plane function node may then construct a message which indicates a request for charging based on the usage report data and the secondary RAT usage report data. The message which indicates the request for charging may indicate a plurality of rating groups respectively associated with a plurality of usage data of the UE, and a plurality of identifiers of flows or bearers associated with the traffic of the UE in respective association with the plurality of rating groups. The message which indicates the request for charging includes the identifier of the flow or bearer associated with the traffic of the UE communicated via the secondary RAT. The control plane function node may send to a charging server the message which indicates the request for charging, for use in differential charging.

More detailed and alternative techniques and implementations are provided herein as described below.

Example Embodiments

In Fifth Generation (5G) network deployments, there are various interworking options defined by the Third Generation Partnership Project (3GPP) for interworking with Fourth Generation (4G)/Long-Term Evolution (LTE) networks. Amongst all of the options defined by 3GPP, Options 3/3a/3x of the 5G Non-Standalone (5G NSA) architecture are popular. With these options, an Evolved Packet Core (EPC) may anchor calls routed via both an eNodeB (eNB) (i.e. an LTE Radio Access Network "RAN") and a 5G Node B (5G NB) (i.e. 5G New Radio "5G NR"). Operators have the option of deploying dual connectivity so that a user equipment (UE) can communicate via both LTE and 5G NR radios. Here, the 5G NB may be used to support high data rate traffic for the UE, whereas the eNB can be used for handling the UE's remaining data traffic. This feature may be referred to as Evolved Universal Terrestrial Radio Access (E-UTRA)-NR Dual Connectivity (DC) (EN-DC).

Operators are looking for ways to monetize high data rate traffic that is routed via the 5G NR. For the 5G NSA deployment with Options 3/3a/3x, however, a charging server of a charging system does not have adequate information to properly charge for usage that is consumed through 5G NR versus the LTE Radio Access Technology (RAT). Additional messaging could be utilized to communicate appropriate information, but such techniques may be deemed inefficient and/or require unnecessary changes to existing protocols.

To better explain in relation to the figures, FIG. 1A is an illustrative representation of a 5G NSA architecture 100A having with RAN level interworking between an LTE RAN 104 and a 5G NR 106, where connection is made to an EPC 108A. As shown, EPC 108A may include a Mobility Management Entity (MME) 120, a Serving Gateway (SGW) 122, and a Packet Data Network (PDN) Gateway (PGW) 124. In a Control and User Plane Separation (CUPS) architecture, SGW 122 may be split into an SGW Control Plane (SGW-C) and an SGW User Plane (SGW-U), and PGW 124 may be split into a PGW Control Plane (PGW-C) and a PGW User Plane (PGW-U). In 5G NSA architecture 100A, the interworking includes a RAN level interworking between an eNB 110 (i.e. for LTE RAN 104) and a 5G NB 112 (or an "en-gNB") (i.e. for the 5G NR 106).

FIG. 1B is an illustrative representation of a 5G NSA architecture 100B having RAN level interworking between LTE RAN 104 and 5G NR 106, where connection is made to a 5G Core (5GC) 108B. As shown, 5GC 108B may include an Access and Mobility Management Function (AMF) 130, a Session Management Function (SMF) 132, and a User Plane Function (UPF) 134. Again, in 5G NSA architecture 100B, the interworking includes a RAN level interworking between eNB 110 (i.e. for LTE RAN 104) and 5G NB 112 (or the "en-gNB") (i.e. for the 5G NR 106).

Figure 2:
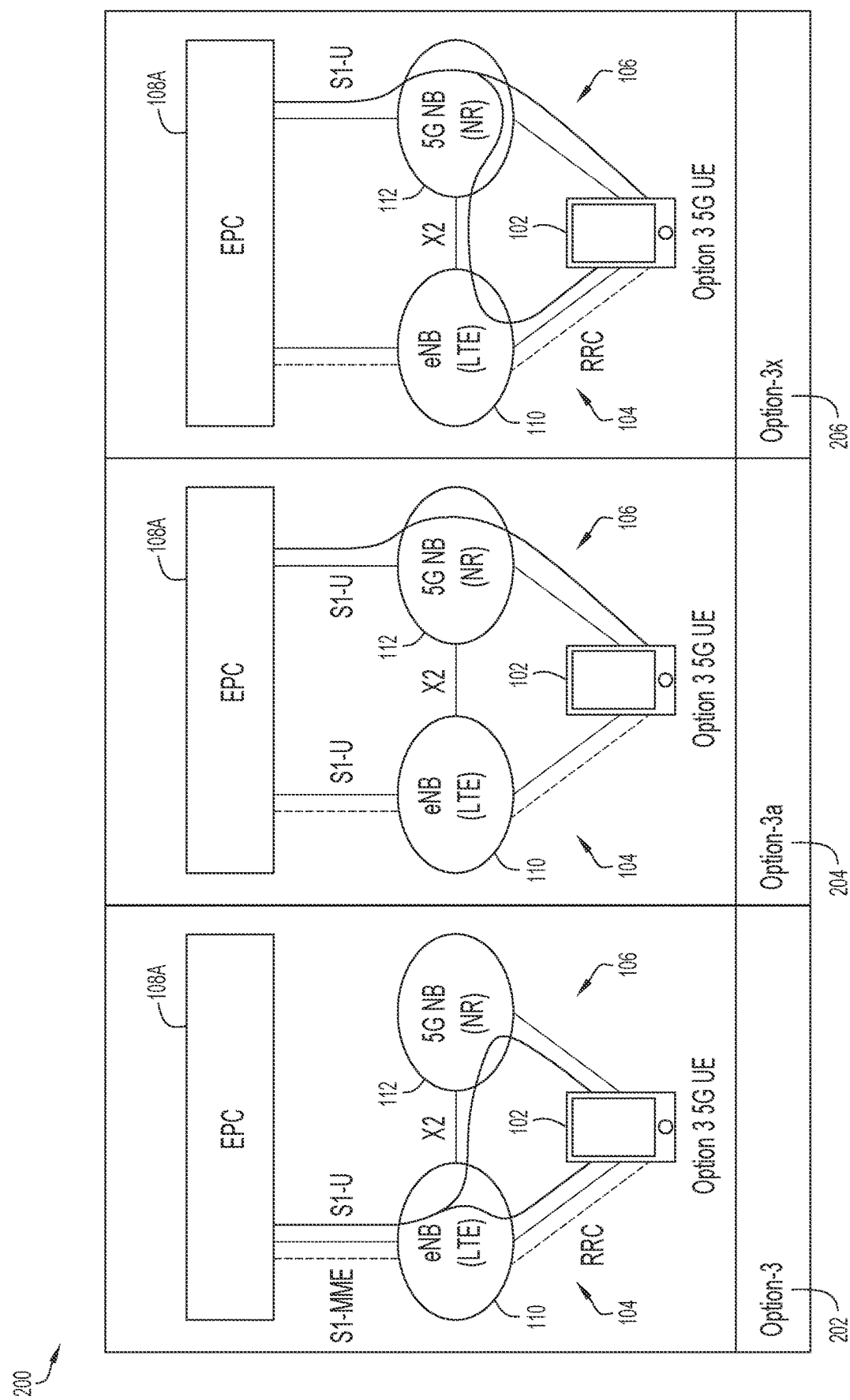
FIG. 2 are illustrative representations of variants of Option-3 for the 5G NSA architecture of FIG. 1A, which include Options 3/3a/3x.

FIG. 2 are illustrative representations of variants 200 of Option-3 associated with the 5G NSA architectures 100A-100B of FIGS. 1A-1B. In FIG. 2, as well as previous FIGS. 1A-1B, dashed connection lines may refer to control plane connections and solid connection lines may refer to user plane connections.

In general, UE 102 may be connected to eNB 110 which serves as a Master Node (MN) and 5G NB 112 which serves as a Secondary Node (SN). UE 102 may be any suitable type of device, such as a cellular telephone, a smart phone, a tablet device, an IoT device, a Machine-to-Machine (M2M) device, a robotics device, and a sensor, to name but a few. The eNB 110 may be connected to EPC 108A through an S1 interface and to 5G NB 112 through an X2 interface. The 5G NB 112 may be connected to EPC 108A through an S1-U interface and other 5G NBs through an X2-U interface.

Variants 200 of Option-3 include Options 3/3a/3x, indicated in FIG. 2 as an Option-3 at 202, an Option-3a at 204, and an Option-3x at 206. In Option-3 at 202, traffic associated with UE 102 may be split across LTE and 5G NR at eNB 110. In Option-3a at 204, traffic associated with UE 102 may be split across LTE and 5G NR at EPC 108A (e.g. at the SGW). In Option-3x at 206, traffic associated with UE 102 may be split across LTE and 5G at 5G NB 112.

As mentioned earlier, operators may not be able to properly monetize the investment of 5G NR unless and until proper RAT type usage can be differentiated for charging. In general, charging involves the sending of a request to a charging server by a control plane function that manages the UE's session. With reference back to 5G NSA architecture 100A of FIG. 1A with EPC 108A, a message which indicates a request for charging (e.g. a Credit-Control Request or "CCR") may be sent (e.g. from the PGW-C) to the charging server of an Online Charging System (OCS)/a Charging Data Function (CDF) 140A for generation of a Charging Data Record (CDR). Note that, in 4G, an OCS may be utilized for online charging and a CDF may be utilized for offline charging. The generated CDR may be communicated to a Billing Domain (BD) 150 (e.g. through a Charging Gateway "CGW") for processing.

For charging in 5G NSA architecture 100B of FIG. 1B with 5GC 108B, a message which indicates a request for charging (e.g. a charging data request) may be sent (e.g. from SMF 132) to a charging server which may be or include a CDF 140B for generation of a CDR. Again, the CDR may be communicated to BD 150 (e.g. through the CGW) for processing.

More specifically, in relation to FIG. 1B having the 5GC 108B and CHF 140B, UPF 134 may send a usage report to SMF 132 regarding usage of UE 102. The usage of UE 102 may be the total usage of traffic of UE 102 communicated via LTE RAN 104 (eNB 110) and 5G NR 106 (5G NB 112). In turn, SMF 132 may send a charging data request to CHF 140B for generating a CDR for billing. The usage report from UPF 134 to SMF 132 may be provided according to a Rating Group (RG) and a Service ID. Usage may be reported by SMF 132 to CHF 140B inside a MultiUnitUsage (MUU) that contains a report for each RG and Service ID. Similar messaging, formatting, and handling may be performed with the EPC 108A and OCS/CDF 140A of FIG. 1A, with use of the CCR and Multiple Services Credit Control (MSCC).

As part of Options 3/3a/3x, LTE RAN 104 and 5G NR 106 may be configured to report secondary RAT usage information. For LTE RAN 104, the secondary RAT usage information includes uplink (UL)/downlink (DL) for a given Evolved Packet System (EPS) Bearer ID (EBI) of the associated EPS Bearer and RAT type. For 5G NR 106, the secondary RAT usage information includes UL/DL volume for a given Quality of Service (QoS) Flow Identifier (QFI) of the associated QoS Flow and RAT type. The secondary RAT usage information may be communicated by SMF 132 to CHF 140B (e.g. or by the PGW-C to the OCS). Accordingly, CHF 140B (e.g. or the OCS) may know the usage consumed at LTE RAN 104 versus 5G NR 106 at the QFI level (e.g. or EBI level) for the respective RAT type.

Unfortunately, however, CHF 140B (e.g. or the OCS) has no mechanism to associate the UPF-provided RG-based usage with LTE-RAT or 5G NR usage. Although CHF 140B (e.g. or the OCS) may have secondary RAT usage per QFI level (e.g. or EBI level) and RAT type, it is provided for auditing. Given the current limitations, CHF 140B (e.g. or the OCS) is unable to perform differential charging associated with UE 102. With the current architecture, CHF 140B (e.g. or the OCS) is unaware of whether the usage associated with the various RGs is consumed at LTE RAN 104 or 5G NR 106.

According to some implementations of the present disclosure, techniques and mechanisms may be provided to allow an operator to monetize usage of 5G NR in 5G NSA deployments in an efficient manner with minimal changes to network protocols.

In some implementations, the SMF/PGW-C may send to the CHF/OCS a message which indicates a request for charging with relevant information in a Protocol Data Unit (PDU) container along with the charging information. Notably, the relevant information may include an identifier of a flow or bearer associated with the traffic of the UE communicated via the secondary RAT (i.e. a Quality of Service Flow Identifier or "QFI" in case of 5G, and an Evolved Packet System Bearer ID or "EBI" in case of 4G). In some implementations, timestamp information may also be provided together with this information.

More particularly, in some detailed implementations, per 3GPP Technical Specification (TS) 32.291, Sect. 6.1.6.2.2.9, "Usage" is reported in a Charging Data Request as:
ChargingDataReq→MultiUnitUsage→UsedUnitContainer→Usage and PduContainer
Here, a QFI of a QoS Flow may be added in a PDU container along with other information about the usage in the charging data request.

Accordingly, in the PDUContainerInformation, the CHF/OCS may identify the usage in the Multiple Unit Usage (MUU)→Used Unit Container (UUC) per QFI. With secondary RAT usage report data in an Information Element (IE), the CHF/OCS may determine how much data was communicated via the LTE RAN or 5G NR for a particular QFI/EBI. Once it is determined that the usage either for RG or RG+Service ID along with QFI/EBI was consumed at the LTE RAN or 5G NR, the information can be used for differential billing based on the RAT type. With appropriate processing, the CHF/OCS may create one or more CDRs for differential billing for appropriate charging according to LTE RAN or 5G NR.

Figure 3:
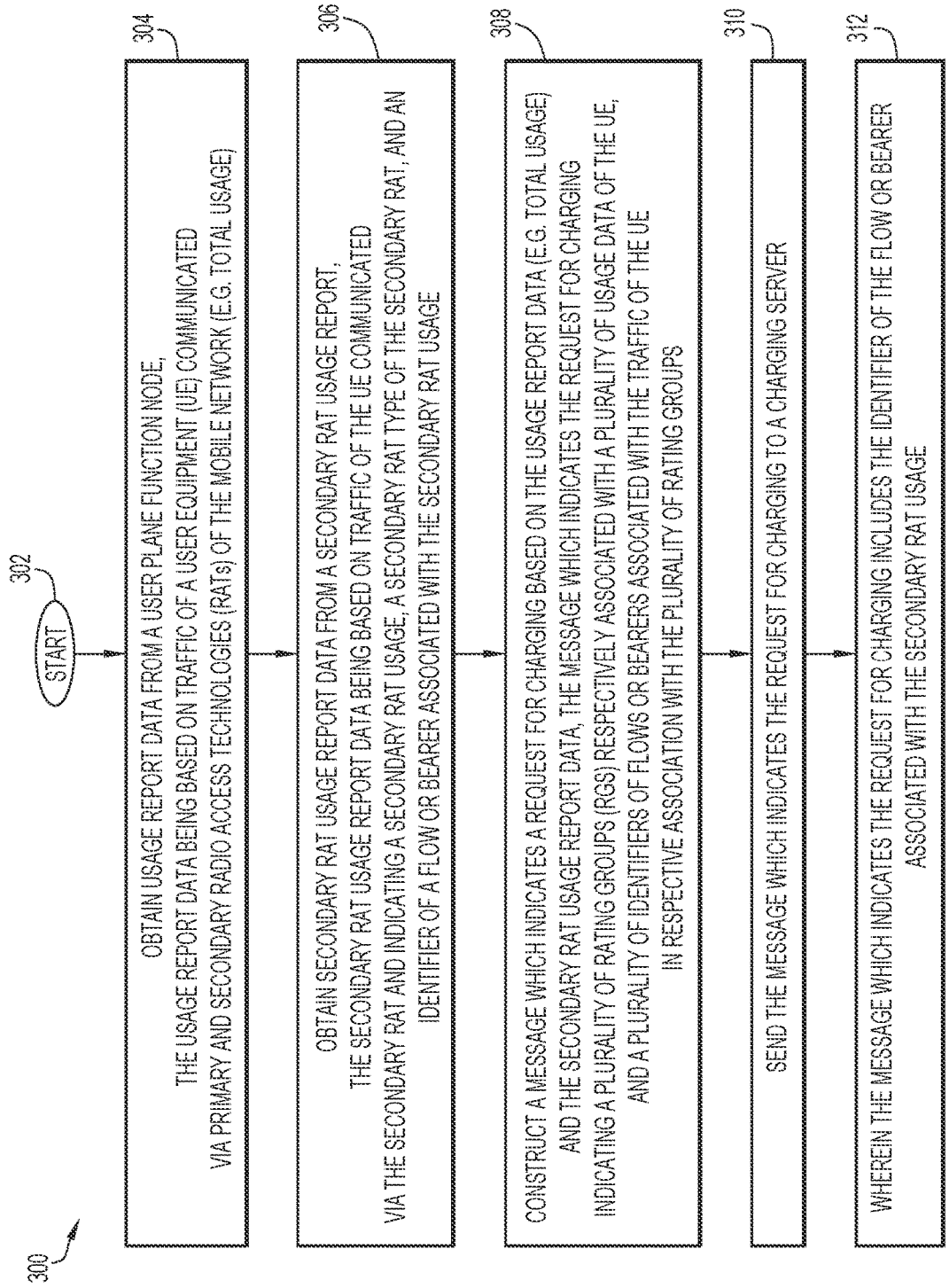
FIG. 3 is a flowchart for describing a method for RAT type usage differentiation for differential charging in a 5G NSA architecture deployment having RAN level interworking between an LTE RAN and a 5G NR according to some implementations of the present disclosure.

FIG. 3 is a flowchart 300 for describing a method of RAT type usage differentiation for differential charging in a 5G NSA architecture deployment having RAN level interworking between an LTE RAN and a 5G NR according to some implementations of the present disclosure. The method of FIG. 3 may be performed by a control plane function node (e.g. a PGW-C node, an SMF node, an SMF+PGW-C node, etc.) for use in the 5G NSA network architecture. More particularly, the method of FIG. 3 may be performed by a network node or computing device configured to connect in a network for communication, to operate a control plane function (e.g. a PGW-C, an SMF, an SMF+PGW-C, etc.). In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as a control plane function, a PGW-C, an SMF, an SMF+PGW-C, or other similar function(s).

Beginning at a start block 302 of FIG. 3, the control plane function node may obtain usage report data from a user plane function node (step 304 of FIG. 3). The usage report data may be based on traffic of a UE communicated via the primary and secondary RATs (e.g. the total usage of the UE). The control plane function node may also obtain secondary RAT usage report data from a second RAT usage report (step 306 of FIG. 3). The secondary RAT usage report data may be based on traffic of the UE communicated via the secondary RAT. The secondary RAT usage report data may indicate a secondary RAT usage, a secondary RAT type of the secondary RAT, and an identifier of a flow or bearer associated with the secondary RAT usage. In some implementations or scenarios, the obtaining of the secondary RAT usage report data in step 306 may precede the obtaining of the usage report data (e.g. total usage) in step 308.

The control plane function node may then construct a message which indicates a request for charging based on the usage report data and the secondary RAT usage report data (step 308 of FIG. 3). The message which indicates the request for charging may indicate a plurality of rating groups respectively associated with a plurality of usage data of the UE, and a plurality of identifiers of flows or bearers associated with the traffic of the UE in respective association with the plurality of rating groups. In some implementations, the message which indicates the request for charging may indicate one or more of the plurality of rating groups to be respectively associated with one or more service IDs. The construction of the message in step 308 may include population of one or more (or all) of the above-described data items. After the message is constructed, the control plane function node may send the message which indicates the request for charging to a charging server (step 310 of FIG. 3). Notably, the message which indicates the request for charging may include the identifier of the flow or bearer associated with the secondary RAT usage, in respective association with a rating group or a rating group and service ID (step 312 of FIG. 3). In some implementations, in step 306, the step of constructing the message which indicates the request for charging may include populating the secondary RAT usage report data in an IE of the message.

In some scenarios, the primary RAT is the LTE, the secondary RAT is the 5G NR, and the UE connection is anchored in the EPC. Here, the identifier of the flow or bearer associated with the traffic of the UE may be an EBI of an EPS bearer. In other scenarios, the primary RAT is the LTE, the secondary RAT is the 5G NR, and the UE connection is anchored in the 5GC. Here, the identifier of the flow or bearer associated with the traffic of the UE may be a QFI of a QoS Flow.

In some scenarios, as the UE connection may be anchored in the EPC, the request for charging may be a credit-control request or "CCR" having MSCC information indicating the plurality of rating groups. The plurality of rating groups may be respectively associated with a plurality of Used Service Units (USUs); and the plurality of USUs may respectively include the plurality of identifiers of the flows or bearers for communication the traffic of the UE, including the identifier of the flow or bearer associated with the traffic of the UE communicated via the secondary RAT. In other scenarios, as the UE connection may be anchored in the 5GC, the request for charging may be a charging data request having MUU information indicating the plurality of rating groups that are respectively associated with the plurality of usage data of the UE. The plurality of rating groups may be respectively associated with a plurality of UUCs; the plurality of UUCs may respectively contain a plurality of PDU containers; and the plurality of PDU containers may respectively contain the plurality of identifiers of the flows or bearers associated with the traffic of the UE communicated via the primary RAT, including the identifier of the flow or bearer associated with the traffic of the UE communicated via the secondary RAT.

In the method of FIG. 3, the charging server may receive the message which indicates the charging request. The charging server may associate the corresponding rating group and usage data of the UE together with the (appropriate) secondary RAT type (e.g. 5G NR). The association may be performed by the charging server based on the identifier of the flow or bearer associated with the traffic of the UE communicated via the secondary RAT, together with the secondary RAT usage report. Accordingly, with this RAT type usage differentiation, the charging server may perform tasks to facilitate differential billing. The charging server may generate one or more charging data records or "CDRs" based on the corresponding rating group and usage data as well as the second RAT type. The charging server may then send the one or more charging data records to a billing domain (e.g. through a charging gateway or CGW).

As previously described, the proposed solution may be configured for use in relation to the 4G core or the 5G core. In relation to the 5GC, where 3GPP TS 32.291 is applicable, techniques and mechanisms utilizing a charging data request having a MUU, a UUC, and a QFI may be utilized. In relation to the EPC, where 3GPP TS 32.299 is applicable, techniques and mechanisms utilizing a CCR having a MSCC, a USU, and an EBI may be utilized.

Figure 4:
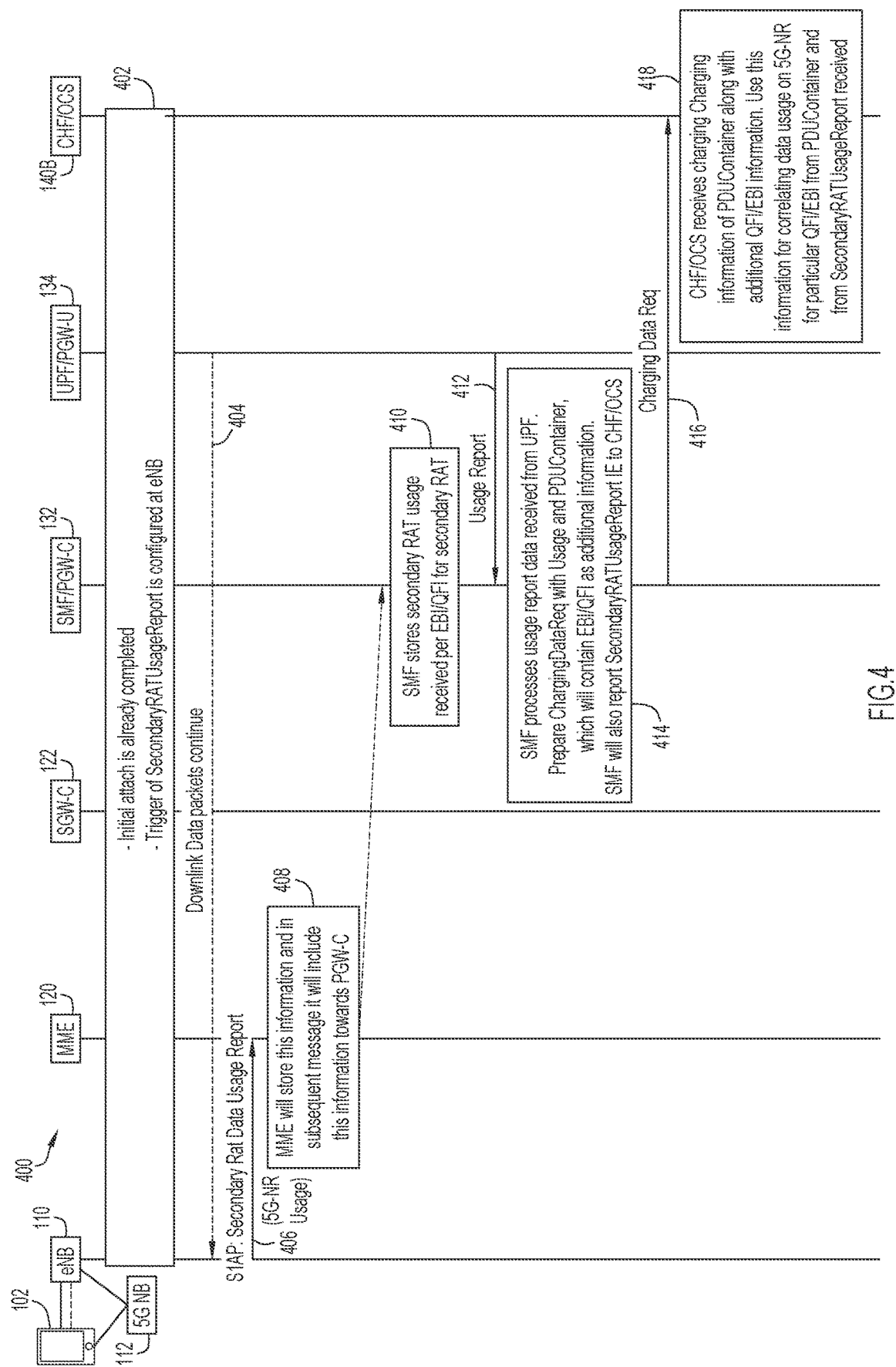
FIG. 4 is a basic call flow diagram for describing a basic call flow for RAT type usage differentiation for differential charging in a 5G NSA architecture deployment having RAN level interworking between an LTE RAN and a 5G NR according to some implementations of the present disclosure.

FIG. 4 is a basic call flow diagram 400 for describing a basic call flow for RAT type usage differentiation for differential charging in a 5G NSA architecture deployment having RAN level interworking between an LTE RAN and a 5G NR according to some implementations of the present disclosure.

Initially in FIG. 4, UE 102 may be attached to the network, where eNB 110 is configured to trigger secondary RAT usage reports of secondary RAT usage (e.g. for 5G NR usage) (step 402 of FIG. 4). Data packets (e.g. DL data packets) associated with traffic of UE 102 may be communicated via UPF 134 (step 404 of FIG. 4). Traffic to UE 102 may be split through eNB 110 and 5G NB 112. The eNB 110 may trigger a secondary RAT usage report associated with usage via 5G NB 112 (i.e. 5G NR usage). The secondary RAT usage report may be sent to MME 120 with use of S1 Application Protocol (S1AP) signaling (step 406 of FIG. 4). MME 120 may store the information and, in subsequent messaging, communicate the information towards SMF 132 (step 408 of FIG. 4). Eventually, SMF 132 will receive and store the secondary RAT usage report data (step 410 of FIG. 4).

Sometime during operation, UPF 134 will send to SMF 132 a message which indicates a usage report associated with UE 102 (step 412 of FIG. 4). The usage report may be based on traffic of UE 102 communicated via the primary and secondary RATs (via eNB 110 and 5G NB 112) (e.g. indicating the total usage of UE 102). SMF 132 may receive and process the message which indicates the usage report (step 414 of FIG. 4). Here, SMF 132 may prepare a message which indicates a charging data request based on the usage report data and the secondary RAT usage report data. The message which indicates the charging data request may include a PDU container for each usage data associated with a rating group (or rating group plus service ID). Each PDU container will contain the EBI or QFI associated with the EPS bearer or QoS Flow for the usage data (e.g. including for the secondary RAT usage). The message may also include the secondary RAT usage report in an IE of the message. SMF 132 may send to CHF 140B the message which indicates the charging data request (step 416 of FIG. 4). CHF 140B may receive and process the message which indicates the charging data request (step 418 of FIG. 4). CHF 140B may obtain the charging information including each PDU container with an EBI or QFI. CHF 140B may utilize the information for correlating and/or identifying usage data associated with the 5G NR based on the particular EBI or QFI from the PDU container and the secondary RAT usage report.

Figure 5A:
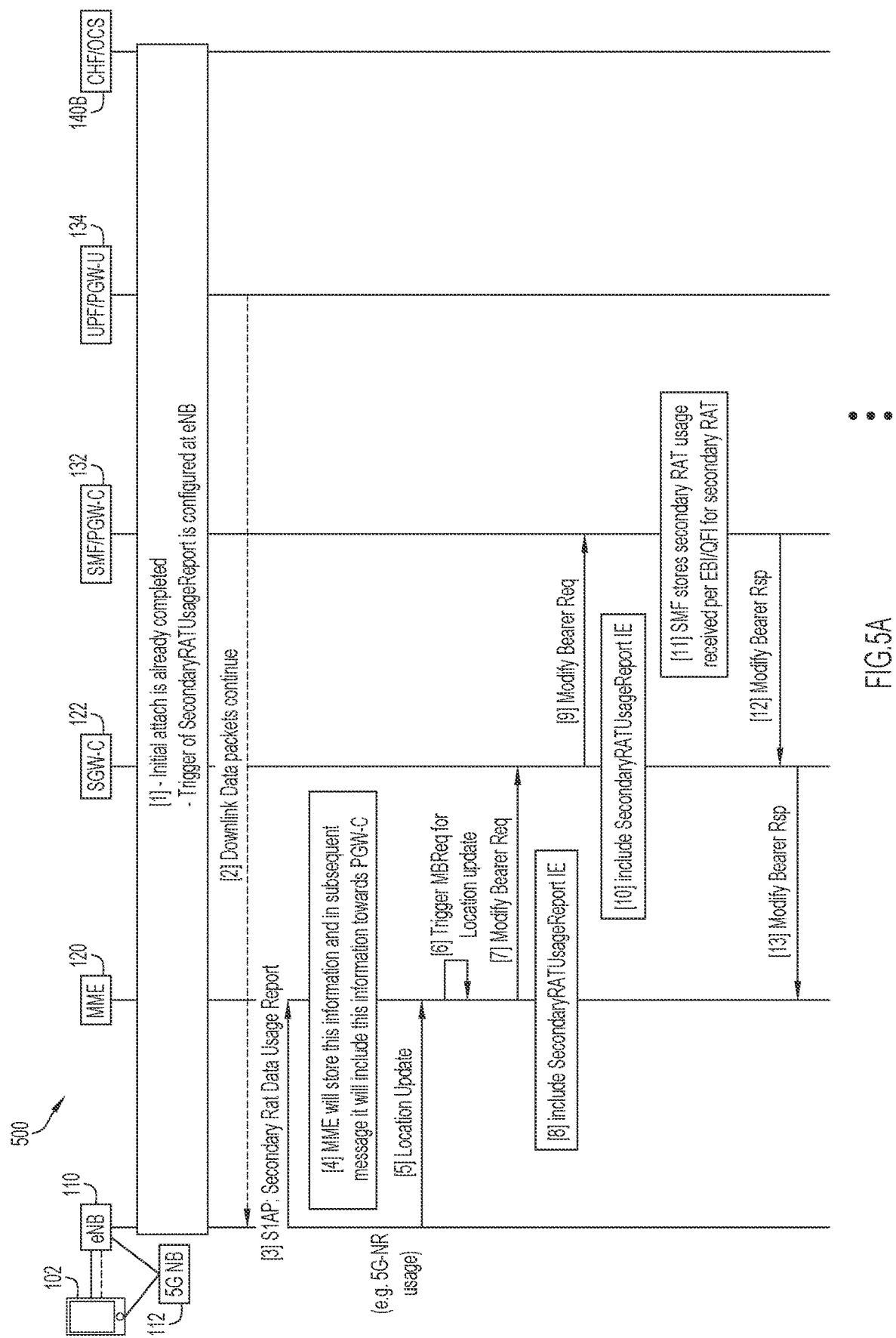

FIGS. 5A-5B form a detailed call flow diagram 500 for describing a more detailed call flow for RAT type usage differentiation for differential charging in a 5G NSA architecture deployment having RAN level interworking between an LTE RAN and a 5G NR according to some implementations of the present disclosure. The call flow diagram 500 of FIGS. 5A-5B is a more expansive and detailed call flow as compared to basic call flow diagram 400 of FIG. 4.

Initially in FIG. 5A, UE 102 may be attached to the network, where eNB 110 is configured to trigger secondary RAT usage reports of secondary RAT usage (e.g. for 5G NR usage) (step 1 of FIG. 5A). Data packets (e.g. DL data packets) associated with traffic of UE 102 may be communicated via UPF 134 (step 2 of FIG. 5A). Traffic to UE 102 may be split through eNB 110 and 5G NB 112. The eNB 110 may trigger a secondary RAT usage report associated with usage via 5G NB 112 (i.e. 5G NR usage). The secondary RAT usage report may be sent to MME 120 with use of S1AP signaling (step 3 of FIG. 5A). MME 120 may store the information and, in subsequent messaging, communicate the information towards SMF 132 (step 4 of FIG. 5A). The eNB 110 may send to MME 120 a message which indicates a location update (step 5 of FIG. 5A). MME 120 may receive the message which indicates the location update, which is set to trigger a modify bearer request (step 6 of FIG. 5A). MME 120 may send to SGW-C 122 a corresponding message which indicates a modify bearer request (step 7 of FIG. 5A), including the IE having the secondary RAT usage report (step 8 of FIG. 5A). SGW-C 122 may receive the corresponding message which indicates the modify bearer request. SGW-C 122 may send to SMF 132 a further corresponding message which indicates the modify bearer request (step 9 of FIG. 5A), again including the IE having the secondary RAT usage report (step 10 of FIG. 5A). SMF 132 will receive and store the secondary RAT usage report data (step 11 of FIG. 5A). In response, SMF 132 may return to SGW-C 122 a message which indicates a modify bearer response (step 12 of FIG. 5A), and in turn, SGW-C 122 may return to MME 120 a message which indicates the modify bearer response (step 13 of FIG. 5A).

Continuing the detailed call flow diagram in FIG. 5B, UPF 134 has been configured to send usage reports for reporting quota usage (step 14 of FIG. 5B). In some implementations, UPF 134 has been configured to send periodic usage reports for reporting periodic quota usage. Sometime during operation, UPF 134 sends to SMF 132 a message which indicates a (periodic) usage report associated with UE 102 (step 15 of FIG. 5B). The usage report may be based on traffic of UE 102 communicated via the primary and secondary RATs (via eNB 110 and 5G NB 112) (e.g. indicating the total usage of UE 102). The message may be a Packet Forwarding Control Protocol (PFCP) message and, more particularly, a PFCP Report request message. SMF 132 may receive the message which indicates the usage report and store the usage information per rating group and service ID (step 16 of FIG. 5B). SMF 132 may return to UPF 134 a PFCP Report response message (step 17 of FIG. 5B).

SMF 132 may prepare a message which indicates a charging data request based on the usage report data and the secondary RAT usage report data (step 18 of FIG. 5B). The message which indicates the charging data request may include a PDU container for each usage data associated with a rating group (or rating group plus service ID). Each PDU container will contain the EBI or QFI associated with the EPS bearer or QoS Flow for the usage data (e.g. including for the secondary RAT usage). The message may also include the secondary RAT usage report in an IE of the message. SMF 132 may send to CHF 140B the message which indicates the charging data request (step 19 of FIG. 5B). CHF 140B may receive and process the message which indicates the charging data request (step 20 of FIG. 5B). CHF 140B may obtain the charging information including each PDU container with an EBI or QFI. CHF 140B may utilize the information for correlating and/or identifying usage data associated with the 5G NR based on the particular EBI or QFI from the PDU container and the secondary RAT usage report.

In some implementations of FIGS. 5A-5B, CHF 140B may receive the message which indicates the charging request and associate the corresponding rating group and usage data together with the appropriate secondary RAT type (e.g. 5G NR). The association may be performed by CHF 140B based on the EBI or QFI associated with the traffic of UE 102 communicated via the secondary RAT (i.e. 5G NB 112). With this RAT type usage differentiation, CHF 140B may perform tasks to facilitate differential billing. CHF 140B may generate one or more CDRs based on the corresponding rating group and usage data associated with the second RAT type (i.e. 5G NB 112). CHF 140B may then send the one or more CDRs to a billing domain (e.g. through a CGW).

Figure 6:
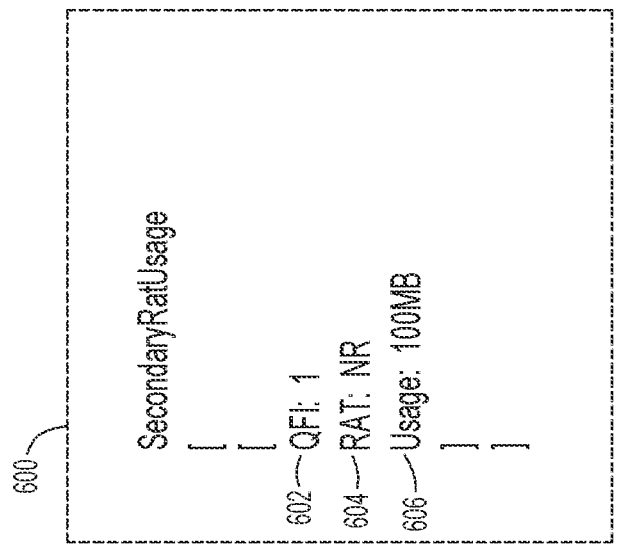
FIG. 6 is an example illustrative representation of secondary RAT usage report data of a secondary RAT usage report, for use in a detailed illustrative example of the present disclosure.
Figure 7:
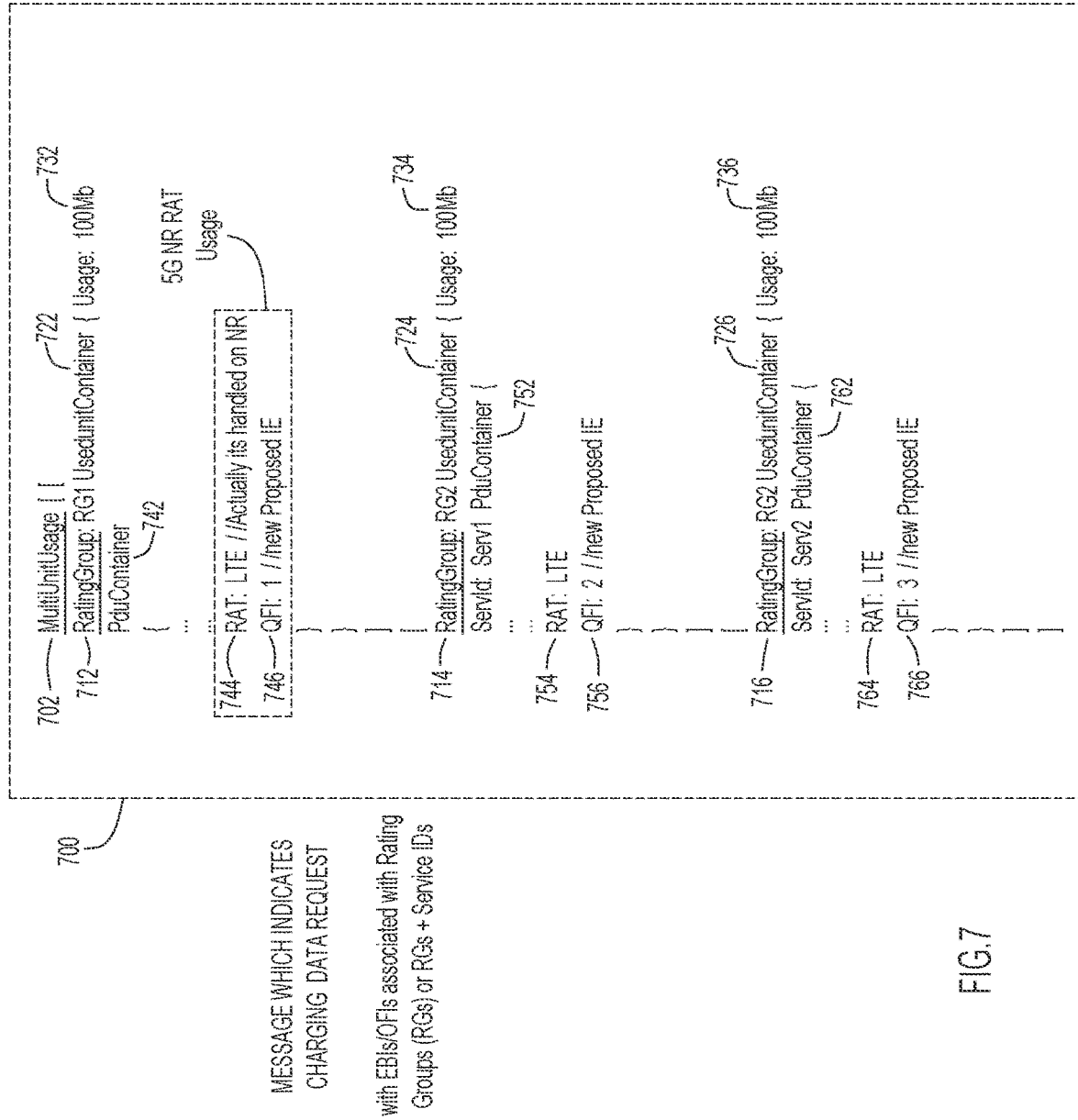
FIG. 7 is an example illustrative representation of a message portion of a message which indicates a request for charging (e.g. a charging data request), for use in the detailed illustrative example of the present disclosure.

A detailed illustrative example is now described in relation to FIGS. 6 and 7. In this example, a UE may have a call anchored at the SMF/PGW-C and have three (3) QoS Flows in a session. The three (3) QoS Flows may be associated with parameters and/or characteristics as provided in Table 1 below.

| QoS Flow # | QFI | Rating Group | RAT Type |
|---|---|---|---|
| QoS Flow 1 | QFI = 1 | RG1 | 5G NR |
| QoS Flow 2 | QFI = 2 | RG2 + Service ID1 | LTE |
| QoS Flow 3 | QFI = 3 | RG2 + Service ID3 | LTE |

Table 1. Parameters and/or characteristics of three (3) QoS Flows for the detailed example.

FIG. 6 is an example representation of secondary RAT usage report data 600 of a secondary RAT usage report according to the current architecture, which is based on the three (3) QoS Flows of the detailed example. The secondary RAT usage report may be communicated from the SMF/PGW-C to the CHF/OCS. As shown in FIG. 6, secondary RAT usage report data 600 may indicate a secondary RAT type 604 (i.e. RAT: NR, which is "5G NR") of the secondary RAT, and a secondary RAT usage 606 (i.e. Usage: 100 MB) associated with traffic of the UE communicated via the secondary RAT. Secondary RAT usage report data 600 may further indicate an identifier 602 (i.e. QFI: 1) of a flow or bearer associated with the traffic of the UE communicated via the secondary RAT.

Given the secondary RAT usage report, the CHF/OCS may identify that QFI 1 has used 100 MB on the 5G NR. However, which RG and/or RG+Service ID that is associated with this usage is not known. According to the proposed solution, the RG-based usage from the SMF/PGW-C to the CHF/OCS may be correlated with the usage report received through the secondary RAT usage report.

Continuing with the detailed example, FIG. 7 is an example representation of a message portion 700 of a message which indicates a request for charging (e.g. a charging data request) according to some implementations of the present disclosure. As illustrated, the message portion 700 indicates a plurality of rating groups 712, 714, and 716 respectively associated with a plurality of usage data 732, 734, and 736 of the UE. In FIG. 7, the request for charging may be indicated as a charging data request having MUU information 702 indicating the plurality of rating groups 712, 714, and 716. The plurality of rating groups 712, 714, and 716 may be respectively associated with a plurality of UUCs 722, 724, and 726 which contain the plurality of usage data 732, 734, and 736 of the UE.

The plurality of UUCs 722, 724, and 726 may respectively include a plurality of PDU containers 742, 752, and 762. The plurality of PDU containers 742, 752, and 762 may respectively contain a plurality of RAT types 744, 754, and 764 that are respectively associated with the plurality of usage data 732, 734, and 736 of the UE. The plurality of PDU containers 742, 752, and 762 may also respectively contain a plurality of identifiers 746, 756, and 766 of flows or bearers associated with the traffic of the UE that are respectively associated with the plurality of usage data 732, 734, and 736 of the UE. Notably in this example, the plurality of identifiers 746, 756, and 766 may include the identifier 746 of the flow or bearer associated with the traffic of the UE communicated via the secondary RAT.

More specifically as indicated in FIG. 7, rating group 712 which is "RG1" is associated with usage data 732 of "100 MB," RAT type="LTE" (which is actually 5G NR), and identifier 746 which is a QFI="1." Rating group 714 which is "RG2" with a Service ID="Serv1" is associated with usage 734 of "100 MB," RAT type="LTE," and identifier 756 which is a QFI="2." Rating group 716 which is "RG2" with a Service ID="Serv2" is associated with usage data 736 of "100 MB," RAT type="LTE," and identifier 766 which is a QFI="3."

Accordingly, usage in FIG. 7 may be reported by the SMF/PGW-C to the CHF/OCS inside a MUU that contains a report for each RG and Service ID. As shown, RG1 usage may be associated with QFI=1 and, together with the SecondaryRatUsageReport, the CHF/OCS may determine that QFI=1 usage was processed using 5G NR. Hence, the CHF/OCS may associate QFI=1 usage with 5G NR, and QFI=2 and QFI 3 usage with LTE-RAT. With use of the above-described solution, the CHF/OCS may determine whether usage either for the RG or RG+Service ID, along with the QFI/EBI, was consumed at the LTE RAN or the 5G NR, which may be used for differential billing according to RAT type.

As an alternative to that shown and described in FIG. 7 for the detailed example, the request for charging may be a credit-control request or "CCR" having MSCC information indicating the plurality of rating groups. Here, the plurality of rating groups may be respectively associated with a plurality of USUs. The plurality of USUs may respectively include the plurality of identifiers of flows or bearers for communication the traffic of the UE, and including the identifier of the flow or bearer associated with the traffic of the UE communicated via the secondary RAT.

Figure 8:
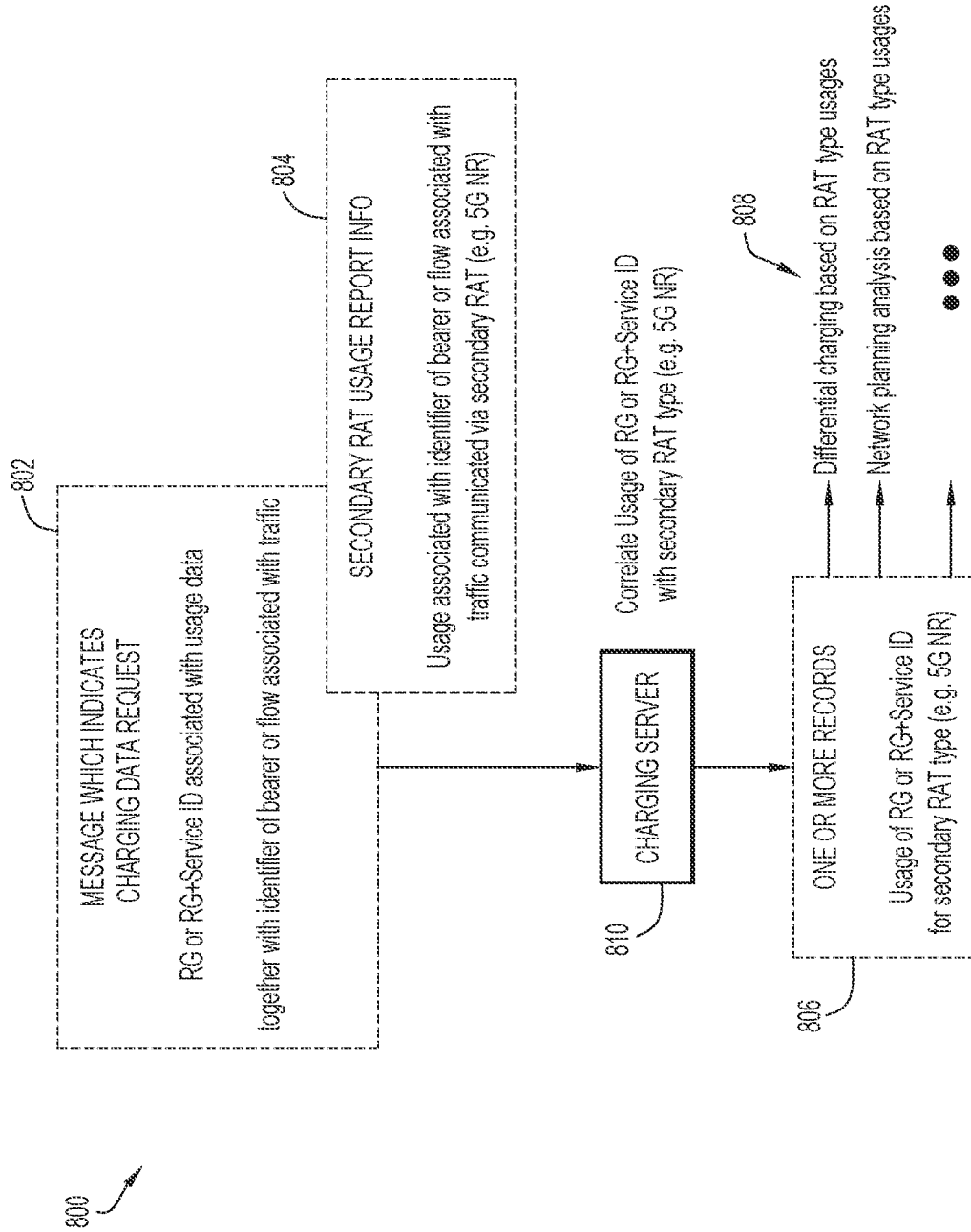
FIG. 8 is a message flow diagram to illustrate example processing associated with a charging server associated with a charging server for differential charging based on RAT type usage differentiation according to some implementations of the present disclosure.

FIG. 8 is a message flow diagram 800 to illustrate example processing associated with a charging server 810 configured for differential charging based on RAT type usage differentiation according to some implementations of the present disclosure. Charging server 810 may receive a message 802 which indicates a request for charging associated with a UE, which may be generated and communicated from a control plane function node (e.g. SMF or PGW-C). The message 802 may indicate a plurality of rating groups (e.g. RG or RG+Service ID) respectively associated with a plurality of usage data of a UE. Each one of the rating groups (e.g. RG or RG+Service ID) may be associated with an identifier of a flow or bearer (e.g. a QFI of a QoS Flow, or an EBI of an EPS Bearer) associated with traffic of the UE. At least one of the identifiers of the flows or bearers may be associated with traffic of the UE communicated via the secondary RAT. The message 802 may further include an IE 804 which includes secondary RAT usage report information. The secondary RAT usage report information may indicate a secondary RAT usage, a secondary RAT type of the secondary RAT, and an identifier of a flow or bearer associated with the secondary RAT usage.

Accordingly, RAT type usage differentiation may be performed. Using the information in message 802 and the secondary RAT usage report information of IE 804, charging server 810 may correlate a rating group (e.g. RG or RG+Service ID) and usage data with a secondary RAT type (e.g. 5G NR). More particularly, charging server 810 may associate the rating group and usage data of the UE with the secondary RAT type (e.g. 5G NR) based on the identifier of the flow or bearer associated with the traffic of the UE communicated via the secondary RAT. Accordingly, charging server 810 may generate one or more records including a charging data record 806 for the usage according to the rating group, the usage data, and the second RAT type (e.g. 5G NR). Charging data record 806 may be utilized for a number of different processing tasks 808, such as for differential charging for 5G NR usage, network planning analysis, etc.

Thus, differential charging for LTE RAN and 5G NR data traffic in 5G NSA architecture deployments may be realized. The proposed solution is applicable for interworking options 3/3a/3x as well as other compatible variants. RAT type usage differentiation of the present disclosure may facilitate differential charging for subscriber usage through LTE RAN or 5G NR. Such efficient processing enables the operator monetize 5G and open up potential revenue generation. As described previously, the proposed solution may be configured for use in relation to the EPC and/or the 5GC. For 5G, where 3GPP TS 32.291 is applicable, techniques and mechanisms utilizing a charging data request having a MUU, a UUC, and a QFI may be utilized. In relation to 4G/LTE, where 3GPP TS 32.299 is applicable, techniques and mechanisms utilizing a CCR having a MSCC, a USU, and an EBI may be utilized.

Accordingly, techniques and mechanisms for RAT type usage differentiation for differential charging in a 5G NSA architecture having RAN level interworking between an LTE RAN and a 5G NR have been described. In some implementations, the mobile network may the 5G NSA architecture is based on any one of options 3/3a/3x according to 3GPP standards. The techniques and mechanisms are configured in the mobile network with minimal changes to network protocols and allow an operator to monetize usage of 5G NR in 5G NSA deployments in an efficient manner.

In one illustrative example, a method may be performed at a control plane function node configured for use in a mobile network including a 5G NSA architecture having RAN level interworking between an LTE RAN and a 5G NR. The method may involve obtaining usage report data from a user plane function node, where the usage report data are based on traffic of a UE communicated via primary and secondary RATs of the mobile network; obtaining secondary RAT usage report data from a second RAT usage report, where the secondary RAT usage report data are based on traffic of the UE communicated via the secondary RAT and indicate a secondary RAT usage, a secondary RAT type of the secondary RAT, and an identifier of a flow or bearer associated with the secondary RAT usage; and constructing a message which indicates a request for charging based on the usage report data and the secondary RAT usage report data, the message which indicates the request for charging indicating a plurality of rating groups respectively associated with a plurality of usage data of the UE, and a plurality of identifiers of flows or bearers associated with the traffic of the UE in respective association with the plurality of rating groups; and sending the message which indicates the request for charging to a charging server, where the message which indicates the request for charging includes the identifier of the flow or bearer associated with the traffic of the UE communicated via the secondary RAT. In some implementations, the message which indicates the request for charging further indicates one or more of the plurality of rating groups that are respectively associated with one or more Service IDs. In some implementations, constructing the message further includes populating the secondary RAT usage report data in an IE of the message.

In some implementations, the method may be continued at the charging server and involve receiving the message which indicates the charging request; associating the corresponding rating group and usage data of the UE with the secondary RAT type, based on the identifier of the flow or bearer associated with the traffic of the UE communicated via the secondary RAT; and generating a charging data record based on the corresponding rating group and usage data as well as the second RAT type.

In some implementations, the request for charging comprises a charging data request having MUU information indicating the plurality of rating groups, the plurality of rating groups are respectively associated with a plurality of UUCs, the plurality of UUCs respectively contain a plurality of PDU containers, and the plurality of PDU containers respectively contain the plurality of identifiers of flows or bearers associated with the traffic of the UE communicated, including the identifier of the flow or bearer associated with the traffic of the UE communicated via the secondary RAT. In some implementations, the request for charging comprises a CCR having MSCC information indicating the plurality of rating groups, the plurality of rating groups are respectively associated with a plurality of USUs, and the plurality of USUs respectively include the plurality of identifiers of flows or bearers for communication the traffic of the UE, including the identifier of the flow or bearer associated with the traffic of the UE communicated via the secondary RAT. In some implementations, the primary RAT comprises the LTE RAN, the secondary RAT comprises the 5G NR, a UE anchor is in an EPC, and identifier of the flow or bearer associated with the traffic of the UE communicated via the secondary RAT comprises an EBI of an EPS bearer.

In some implementations, the primary RAT comprises the LTE RAN, the secondary RAT comprises the 5G NR, a UE anchor is in a 5GC, and identifier of the flow or bearer associated with the traffic of the UE communicated via the secondary RAT comprises a QFI of a QoS Flow.

In another illustrative example, a network node may include one or more interfaces to connect in the mobile network including the 5G NSA architecture having the RAN level interworking between the LTE RAN and the 5G NR; one or more processors; and one or more memory elements for storing instructions executable on the one or more processors for operation as the control plane function and performing the method as described. In yet another illustrative example, a computer program product may include a non-transitory computer readable medium and instructions stored in the computer readable medium, where the instructions are executable on one or more processors to operate at the control plane function node configured for use in the mobile network including the 5G NSA architecture having the RAN level interworking between the LTE RAN and the 5G NR, and performing the method as described.

Figure 9:
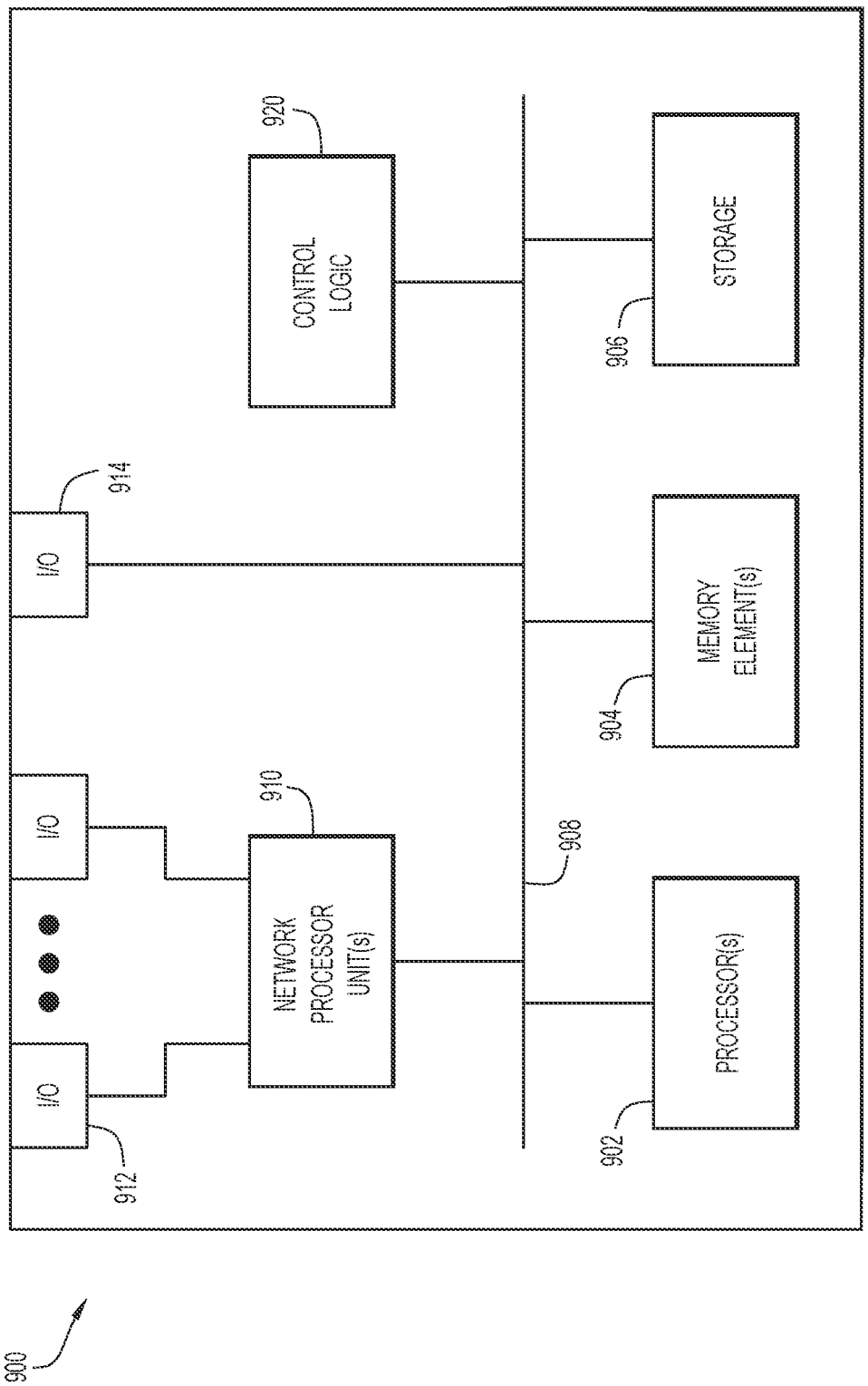
FIG. 9 illustrates a hardware block diagram of a computing device that may perform functions associated with operations discussed herein.

FIG. 9 illustrates a hardware block diagram of a computing device 900 that may perform functions associated with operations discussed herein in connection with the techniques described in relation to the above figures, especially in relation to FIGS. 1A-1B, 2, 3-4, 5A-5B, and 6-7. In various embodiments, a computing device, such as computing device 900 or any combination of computing devices 900, may be configured as any entity/entities as discussed for the techniques depicted in connection with the figures in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at a control plane function node configured for a mobile network,
obtaining usage report data from a user plane function node, the usage report data being based on traffic of a user equipment (UE) communicated via primary and secondary Radio Access Technologies (RATs) of the mobile network;
obtaining secondary RAT usage report data from a second RAT usage report, the secondary RAT usage report data being based on traffic of the UE communicated via the secondary RAT and indicating a secondary RAT usage, a secondary RAT type of the secondary RAT, and an identifier of a flow or bearer associated with the secondary RAT usage;
constructing a message which indicates a request for charging based on the usage report data and the secondary RAT usage report data, the message which indicates the request for charging indicating a plurality of rating groups respectively associated with a plurality of usage data of the UE, and a plurality of identifiers of flows or bearers associated with the traffic of the UE in respective association with the plurality of rating groups; and
sending the message which indicates the request for charging to a charging server,
wherein the message which indicates the request for charging includes the identifier of the flow or bearer associated with the traffic of the UE communicated via the secondary RAT.

2. The method of claim 1, wherein the control plane function node is configured for use in the mobile network having a Fifth Generation (5G) Non-Standalone (NSA) architecture having Radio Access Network (RAN) level interworking between a Long-Term Evolution (LTE) RAN and a 5G New Radio (NR).

3. The method of claim 2, wherein the primary RAT comprises the LTE RAN, the secondary RAT comprises the 5G NR, a UE anchor is in an Evolved Packet Core (EPC), and identifier of the flow or bearer associated with the traffic of the UE communicated via the secondary RAT comprises an Evolved Packet System (EPS) Bearer ID (EBI) of an EPS bearer.

4. The method of claim 2, wherein the primary RAT comprises the LTE RAN, the secondary RAT comprises the 5G NR, a UE anchor is in a 5G Core (5GC), and identifier of the flow or bearer associated with the traffic of the UE communicated via the secondary RAT comprises a Quality of Service (QoS) Flow Identifier (QFI) of a QoS Flow.

5. The method of claim 1, wherein constructing the message further includes populating the secondary RAT usage report data in an information element (IE) of the message.

6. The method of claim 1, wherein:
the request for charging comprises a charging data request having Multiple Unit Usage (MUU) information indicating the plurality of rating groups,
the plurality of rating groups are respectively associated with a plurality of Used Unit Containers (UUCs), the plurality of UUCs respectively contain a plurality of Protocol Data Unit (PDU) containers, and the plurality of PDU containers respectively contain the plurality of identifiers of flows or bearers associated with the traffic of the UE communicated, and including the identifier of the flow or bearer associated with the traffic of the UE communicated via the secondary RAT.

7. The method of claim 1, wherein:

the request for charging comprises a credit-control request (CCR) having Multiple Services Credit Control (MSCC) information indicating the plurality of rating groups, the plurality of rating groups are respectively associated with a plurality of Used Service Units (USUs), and the plurality of USUs respectively include the plurality of identifiers of flows or bearers for communication the traffic of the UE, including the identifier of the flow or bearer associated with the traffic of the UE communicated via the secondary RAT.

8. The method of claim 1, wherein the message which indicates the request for charging further indicates one or more of the plurality of rating groups that are respectively associated with one or more Service IDs.

9. The method of claim 1, further comprising:

at the charging server,
  receiving the message which indicates the request for charging;
  associating a corresponding rating group and usage data of the UE with the secondary RAT type, based on the identifier of the flow or bearer associated with the traffic of the UE communicated via the secondary RAT; and
  generating a charging data record based on the corresponding rating group and usage data as well as the second RAT type.

10. A computer program product comprising:

a non-transitory computer readable medium;
instructions stored in the computer readable medium;
the instructions being executable on one or more processors to operate a control plane function of a mobile network, for:
  obtaining usage report data from a user plane function node, the usage report data being based on traffic of a user equipment (UE) communicated via primary and secondary Radio Access Technologies (RATs) of the mobile network;
  obtaining secondary RAT usage report data from a second RAT usage report, the secondary RAT usage report data being based on traffic of the UE communicated via the secondary RAT and indicating a secondary RAT usage, a secondary RAT type of the secondary RAT, and an identifier of a flow or bearer associated with the secondary RAT usage;
  constructing a message which indicates a request for charging based on the usage report data and the secondary RAT usage report data, the message which indicates the request for charging indicating a plurality of rating groups respectively associated with a plurality of usage data of the UE, and a plurality of identifiers of flows or bearers associated with the traffic of the UE in respective association with the plurality of rating groups; and
  sending the message which indicates the request for charging to a charging server,
  wherein the message which indicates the request for charging includes the identifier of the flow or bearer associated with the secondary RAT usage.

11. The computer program product of claim 10, wherein the instructions are executable on the one or more processors to operate the control plane function in the mobile network which has a Fifth Generation (5G) Non-Standalone (NSA) architecture with Radio Access Network (RAN) level interworking between a Long-Term Evolution (LTE) RAN and a 5G New Radio (NR), and which is based on any one of options 3/3a/3x according to Third Generation Partnership Project (3GPP) standards.

12. The computer program product of claim 11, wherein the primary RAT comprises the LTE RAN, the secondary RAT comprises the 5G NR, a UE anchor is in an Evolved Packet Core (EPC), and identifier of the flow or bearer associated with the traffic of the UE communicated via the secondary RAT comprises an Evolved Packet System (EPS) Bearer ID (EBI) of an EPS bearer.

13. The computer program product of claim 11, wherein the primary RAT comprises the LTE RAN, the secondary RAT comprises the 5G NR, a UE anchor is in a 5G Core (5GC), and identifier of the flow or bearer associated with the traffic of the UE communicated via the secondary RAT comprises a Quality of Service (QoS) Flow Identifier (QFI) of a QoS Flow.

14. The computer program product of claim 10, wherein the instructions are executable on one or more processors to operate the control plane function for constructing the message which indicates the request for charging, by:
  populating the secondary RAT usage report data in an information element (IE) of the message.

15. The computer program product of claim 10, wherein:

the request for charging comprises a charging data request having Multiple Unit Usage (MUU) information indicating the plurality of rating groups, the plurality of rating groups are respectively associated with a plurality of Used Unit Containers (UUCs), the plurality of UUCs respectively contain a plurality of Protocol Data Unit (PDU) containers, and the plurality of PDU containers respectively contain the plurality of identifiers of flows or bearers associated with the traffic of the UE, including the identifier of the flow or bearer associated with the traffic of the UE communicated via the secondary RAT.

16. A network node comprising:

one or more interfaces to connect in a mobile network;
one or more processors; and
one or more memory elements for storing instructions executable on the one or more processors for operation as a control plane function of the mobile network, for:
  obtaining usage report data from a user plane function node, the usage report data being based on traffic of a user equipment (UE) communicated via primary and secondary Radio Access Technologies (RATs) of the mobile network;
  obtaining secondary RAT usage report data from a second RAT usage report, the secondary RAT usage report data being based on traffic of the UE communicated via the secondary RAT and indicating a secondary RAT usage, a secondary RAT type of the secondary RAT, and an identifier of a flow or bearer associated with the secondary RAT usage;
  constructing a message which indicates a request for charging based on the usage report data and the secondary RAT usage report data, the message which indicates the request for charging indicating a plurality of rating groups respectively associated with a plurality of usage data of the UE, and a plurality of identifiers of flows or bearers for communication the traffic of the UE in respective association with the plurality of rating groups; and sending the message which indicates the request for charging to a charging server, wherein the message which indicates the request for charging includes the identifier of the flow or bearer associated with the traffic of the UE communicated via the secondary RAT.

17. The network node of claim 16, wherein the one or more interfaces are configured to connect in the mobile network having a Fifth Generation (5G) Non-Standalone (NSA) architecture with Radio Access Network (RAN) level interworking between a Long-Term Evolution (LTE) RAN and a 5G New Radio (NR).

18. The network node of claim 17, wherein the primary RAT comprises the LTE RAN, the secondary RAT comprises the 5G NR, a UE anchor is in an Evolved Packet Core (EPC), and identifier of the flow or bearer associated with the traffic of the UE communicated via the secondary RAT comprises an Evolved Packet System (EPS) Bearer ID (EBI) of an EPS bearer.

19. The network node of claim 16, wherein the instructions are executable on one or more processors for operation as the control plane function for constructing the message which indicates the request for charging, by:

populating the secondary RAT usage report data in an information element (IE) of the message.

20. The network node of claim 16, wherein:

the request for charging comprises a charging data request having Multiple Unit Usage (MUU) information indicating the plurality of rating groups, the plurality of rating groups are respectively associated with a plurality of Used Unit Containers (UUCs), the plurality of UUCs respectively contain a plurality of Protocol Data Unit (PDU) containers, and the plurality of PDU containers respectively contain the plurality of identifiers of flows or bearers associated with the traffic of the UE, including the identifier of the flow or bearer associated with the traffic of the UE communicated via the secondary RAT.

* * * * *